United States Patent [19]

Murata et al.

[11] Patent Number: 5,135,678
[45] Date of Patent: Aug. 4, 1992

[54] LIQUID CRYSTAL DEVICE

[75] Inventors: Makoto Murata; Masakazu Uekita, both of Hyogo, Japan

[73] Assignee: Kanegafuchi Kagaku Kogyo Kabushiki Kaisha, Osaka, Japan

[21] Appl. No.: 417,114

[22] Filed: Oct. 4, 1989

[30] Foreign Application Priority Data

Oct. 5, 1988 [JP] Japan .............................. 63-251383
Jun. 2, 1989 [JP] Japan .............................. 1-141622

[51] Int. Cl.$^5$ .................. C09K 19/56; G02F 1/13; A61K 37/12
[52] U.S. Cl. .................. 252/299.4; 359/75; 359/103; 528/353
[58] Field of Search ............... 252/299.4; 359/75, 103; 528/353

[56] References Cited

U.S. PATENT DOCUMENTS

| | | | |
|---|---|---|---|
| 4,590,103 | 5/1986 | Ahne et al. | 427/387 |
| 4,943,471 | 7/1990 | Uekita et al. | 428/220 |
| 4,987,219 | 1/1991 | Uekita et al. | 528/353 |
| 4,988,795 | 1/1991 | Uekita et al. | 528/353 |
| 5,020,881 | 6/1991 | Matsuda et al. | 350/333 |

FOREIGN PATENT DOCUMENTS 0059790 9/1982 European Pat. Off. .

OTHER PUBLICATIONS

Patent Abstracts of Japan, vol. 9, No. 323 (p. 414), 18th Dec. 1985; & JP-A-60 149 026 Mitsui Jun. 8, 1985.
Kakimoto, Masaaki et al. "Characteristics of Polyimide Built-Up Film Prepared by LB Method as Liquid Crystal Orienting Film", Preprint of lecture at Chemical Society of Japan, 54th Annual Spring Meeting (1987), 3VIA 45.
Ikeno, Hidenori et al. "Electrooptic Bistability of a Ferroelectric Liquid Crystal Device Prepared Using Polyimide Langmuir-Blodgett Orientation Films", *Japanese Jounral of Applied Physics*, vol. 27, No. 4 (Apr. 1988), pp. L475-L476.
Nishikata, Yasunari et al. "Orientation of Polymer Chain in Polyimide LB Film and Orientation Characteristics of Liquid Crystal on LB Film", Bulletin of the Chemical Society of Japan, 1987, (11), pp. 2174-2179.
Nishikata, Yasunari et al. "Electrooptic and Threshold Characteristics of Ferroelectric Liquid Crystal Cell Processing Polyimide Langmuir-Blodgett Film as an Aligning Layer", *Japanese Journal of Applied Physics*, vol. 27, No. 7 (Jul. 1988), pp. L1163-L1164.

*Primary Examiner*—Robert L. Stoll
*Assistant Examiner*—Shean C. Wu
*Attorney, Agent, or Firm*—Armstrong, Nikaido, Marmelstein, Kubovcik & Murray

[57] ABSTRACT

A liquid crystal device containing an orientation film. The orientation film is made by building up at least one mixed monomolecular film on a substrate having an electrode layer thereon. The mixed monomolecular film is obtained by spreading on a water surface a mixture of:

(a) an amphiphilic high-molecular weight substance having a number average molecular weight of 2,000 to 300,000, which contains a repeating unit (I):

$$\left[ \begin{array}{c} R^3-O-\overset{O}{\overset{\|}{C}} \diagdown \quad \diagup \overset{O}{\overset{\|}{C}}-O-R^4 \\ R^1 \\ -N-\overset{}{\underset{R^5}{C}} \diagup \quad \diagdown \overset{}{\underset{O}{C}}-N-R^2- \\ R^5 \overset{\|}{O} \quad \overset{\|}{O} R^6 \end{array} \right] \quad (I)$$

wherein at least one of $R^1$ and $R^2$ represents a group having benzenoid unsaturation and at least 6 carbon atoms; $R^3$, $R^4$, $R^5$, and $R^6$, which may be the same or different, each represents a hydrogen atom, a substituted or unsubstituted monovalent $C_{1-30}$ aliphatic group, a substituted or unsubstituted monovalent group including an alicyclic group and an aliphatic group having up to 30 carbon atoms in total, or a substituted or unsubstituted monovalent group composed of an aromatic group and an aliphatic group having up to 30 carbon atoms in total, the substituent being one of a halogen atom, a nitro group, an amino group, a cyano group, a methoxy group, and an acetoxy group; at least one of $R^3$, $R^4$, $R^5$, and $R^6$, is a $C_{1-11}$ group other than those above or a hydrogen atom;

(b) an amphiliphilic high-molecular weight substance having a number average molecular weight of 2,000 to 300,000, which contains a repeating unit (II):

$$\left[ -N-\overset{O}{\overset{\|}{C}}-R^1-\overset{O}{\overset{\|}{C}}-N-R^2- \right] \quad (II)$$
$$\quad \overset{|}{R^3} \overset{\|}{O} \quad \overset{\|}{O} \overset{|}{R^4}$$

wherein $R^1$, $R^2$, $R^3$, and $R^4$ are as defined above, at least one of $R^3$ and $R^4$ is a $C_{1-11}$ group other than those above or a hydrogen atom; and (c) at least one low-molecular weight substance. The (a)/(b)/(c) mixing ratio is arbitrary. The film is subject to heat to cause cyclization.

5 Claims, No Drawings

LIQUID CRYSTAL DEVICE

FIELD OF THE INVENTION

This invention relates to a liquid crystal device having a novel liquid crystal orientation film.

BACKGROUND OF THE INVENTION

Conventional processes for forming an orientation film of a liquid crystal device include oblique vapor deposition of $SiO_2$, Au, etc. on a substrate and a process comprising coating a polyimide type high-molecular weight resin on a substrate and rubbing the coat with cloth, etc. to a given direction.

Although oblique vapor deposition is very advantageous in endowing liquid crystals with a fixed pretilt angle, it must be carried out in a high degree of vacuum of about $10^{-5}$ Torr. Further, since a substrate must be inclined, this process has a disadvantage of low mass-productivity.

The rubbing process is susceptible to adverse influences of dust or static electricity generated.

SUMMARY OF THE INVENTION

An object of this invention is to provide a liquid crystal orientation film which provides a liquid crystal device free from defects and uniform in orientation, this film can be produced at low cost with high mass-productivity.

Another object of this invention is to provide a liquid crystal orientation film having excellent chemical resistance and heat resistance as well as the above-described properties.

A further object of this invention is to provide a liquid crystal device containing the above-described liquid crystal orientation film.

It has now been found that the above objects of this invention are accomplished by a liquid crystal device containing an orientation film which is formed by building up at least one mixed monomolecular film on a substrate having thereon an electrode layer, said mixed monomolecular film being obtained by spreading a mixture of (a) an amphiphilic high-molecular weight substance having a number average molecular weight of from 2,000 to 300,000 and containing a repeating unit represented by formula (I):

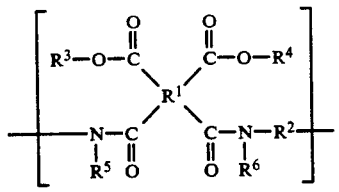

wherein at least one of $R^1$ and $R^2$ represents a group characterized by benzenoid unsaturation having at least 6 carbon atoms; and $R^3$, $R^4$, $R^5$, and $R^6$, which may be the same or different, each represents a hydrogen atom, a substituted or unsubstituted monovalent aliphatic group having from 1 to 30 carbon atoms, a substituted or unsubstituted monovalent group composed of alicyclic group and aliphatic group having up to 30 carbon atoms in total, or a substituted or unsubstituted monovalent group composed of an aromatic group and an aliphatic group having up to 30 carbon atoms in total, the substituent being selected from a halogen atom, a nitro group, an amino group, a cyano group, a methoxy group, and an acetoxy group; at least one of $R^3$, $R^4$, $R^5$, and $R^6$ is a group other than those having from 1 to 11 carbon atoms or a hydrogen atom, (b) an amphiphilic high-molecular weight substance having a number average molecular weight of from 2,000 to 300,000 and containing a repeating unit represented by formula (II):

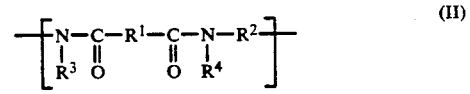

wherein $R^1$, $R^2$, $R^3$, and $R^4$ are as defined above, at lest one of $R^3$ and $R^4$ being a group other than those having from 1 to 11 carbon atoms or a hydrogen atom, and (c) at least one low-molecular weight substance, the (a)/(b)/(c) mixing ratio being arbitrary, on a water surface, and subjecting the film to a heat treatment to cause cyclization.

DETAILED DESCRIPTION OF THE INVENTION

In the present invention, an orientation film which controls orientation of liquid crystals can be obtained by mixing amphiphilic high-molecular weight substances (a) and (b) comprising repeating units (I) and (II), respectively, and at least one low-molecular weight substance (c) at an arbitrary mixing ratio, spreading the mixture on water to form a mixed monomolecular film, building up at least one monomolecular film on a substrate having thereon at least an electrode layer, and subjecting the built-up film to a heat treatment causing cyclization. The mixed monomolecular film comprising amphiphilic high-molecular weight compound (a) having repeating unit (I) and amphiphilic high-molecular weight compound having repeating unit (II); the mixed monomolecular film comprising amphiphilic high-molecular weight compound (a) having repeating unit (I) and low-molecular weight compound (c); or the mixed monomolecular film comprising amphiphilic high-molecular weight compound (b) having repeating unit (II) and low-molecular weight compound (c); which has been heat-treated can not attain the capability of controlling orientation of liquid crystals achieved by the present invention. A mixing ratio of the high-molecular weight compounds (a)/(b) according to the present invention is 9/1 to 1/10 by weight. The low molecular weight compound (c) may be used in an amount of 1/20 to ½ times by weight with respect to the total amount of the high-molecular weight compounds (a) and (b).

The orientation controlling capability of the mixed monomolecular film comprising amphiphilic high-molecular weight compound (a), amphiphilic high-molecular weight compound (b), and low-molecular weight compound (c) can further be improved by subjecting the film to a heat treatment to cause cyclization.

Low-molecular weight compound (c) which can be used in the present invention preferably includes an alcohol having from 10 to 30 carbon atoms (e.g., tetradecyl alcohol) and a carboxylic acid having from 10 to 30 carbon atoms (e.g., octadecanoic acid).

By the heat treatment of the mixed monomolecular film, low-molecular weight substance (c) volatilizes thereby to provide a liquid crystal orientation film having sufficient chemical resistance and heat resistance.

The heat treatment according to the present invention is carried out at a temperature of at least 180° C.

The liquid crystal orientation film thus obtained exhibits excellent orientation performances to endow liquid crystals with uniform and defect-free orientation without requiring treatments such as rubbing. In addition, the liquid crystal orientation film according to the present invention can be mass-produced at low cost. The liquid crystal orientation film of the present invention exhibits satisfactory chemical resistance and heat resistance. By taking advantage of the present invention, there is provided a liquid crystal orientation film by which a ferroelectric liquid crystal may exhibit satisfactory bistability.

The liquid crystal orientation film capable of endowing liquid crystals with uniform and defect-free orientation can be obtained without requiring a rubbing treatment or the like treatment at low cost and with high mass-productivity by forming a build-up film composed of at least one mixed monomolecular film comprising a mixture of amphiphilic high-molecular substance (a), amphiphilic high-molecular substance (b), and at least one low-molecular substance (c) at an arbitrary mixing ratio on a substrate having thereon at least an electrode layer and subjecting the built-up film to a heat treatment to cause cyclization. The liquid crystal orientation film according to the present invention exhibits satisfactory chemical resistance and heat resistance. Further, by using the liquid crystal orientation film of the invention, a ferroelectric liquid crystal can manifest satisfactory bistability.

The present invention is now illustrated in greater detail with reference to the following Examples and Comparative Example, but it should be understood that the present invention is not deemed to be limited thereto. Unless otherwise specified, the parts and percents are by weight.

EXAMPLE 1

Indium tin oxide (ITO) was vacuum-deposited on one side of a glass plate through a mask having a pattern to form an electrode layer having a thickness of 200 nm. Silicon oxide was then vacuum-deposited on the ITO electrode layer to form an insulating film having a thickness of 100 nm.

Separately, an equimolar mixture of polyimide percursor having a molecular weight of about 30,000 (hereinafter referred to as PIP) represented by formula:

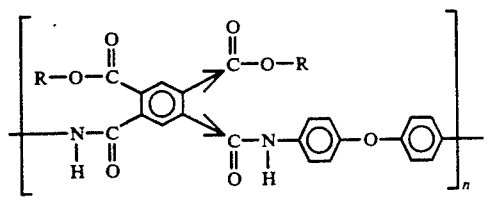

wherein R is $CH_3(CH_2)_{17}$, which was prepared by reacting an acid chloride or distearyl pyromellitate and 4,4'-diaminodiphenyl ether, a polyamide having a molecular weight of about 10,000 (hereinafter referred to as PA) represented by formula:

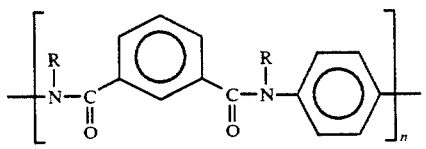

wherein R is $CH_3(CH_2)_{17}$, which was prepared by reacting N,N'-distearyl-p-phenylenediamine and isophthalic acid chloride, and tetradecyl alcohol was dissolved in a mixed solvent of dimethylacetamide and chloroform in a ratio of $CH_3Cl_3/DMAc$ being 8/2.

A mixed monomolecular film was formed using the resulting solution having a concentration of 0.762 mM in accordance with the Langmuir-Blodgett method, and 5 monomolecular layers were built up on the ITO-deposited glass plate. The glass plate having theron the built-up monomolecular film (hereinafter referred to as LB film) was heat-treated at 400° C. for 1 hour. Thus, the tetradecyl alcohol volatilized and PIP was converted to a polyimide represented by formula;

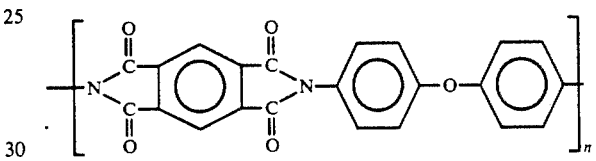

The heat-treated film had very excellent chemical resistance and heat resistance.

The glass substrates were thus prepared. A sealant resin comprising an acid anhydride curable epoxy resin having dispersed therein plastic beads having a particle size of 8 μm was print-coated on the 1 mm wide periphery of one of the glass substrates on the ITO electrotrode side thereof, with 5 mm long central portion of one of the sides (latera) of the glass substrate remaining uncoated. This substrate and the another substrate were assembled into a cell in such a manner that the pick-up directions of the two glass plates during building up of LB film were at right angles with each other and the transparent ITO electrode layers faced to each other, and the cell was heated at 140° C. for 3 hours under pressure to cure the sealant resin for adhesion. After the adhesion, a commercially available nematic liquid crystal ("ZLI 1565" produced by Merck Co.) was infused into the gap of the two substrates through the opening, where the sealant resin had not been applied. The opening was sealed with the sealant resin to complete a TN type liquid crystal cell.

The resulting liquid crystal cell was once heated to 100° C. and then gradually cooled to conduct initial orientation to produce a liquid crystal cell showing uniform and defect-free orientation of the liquid crystal.

COMPARATIVE EXAMPLE 1

A TN type liquid crystal cell was produced in the same manner as in Example 1, except that the LB film was not heat-treated. The initial orientation of the resulting liquid crystal cell was found to involve a partial disturbance ascribed to incorporation of tetradecyl alcohol into the liquid crystal during the heating. The orientation of the liquid crystal was inferior to that obtained in Example 1.

EXAMPLE 2

A ferroelectric liquid crystal cell was produced in the same manner as in Example 1, except for using a 2:2:1 (by mole) mixture of PIP, PA, and octadecanoic acid, replacing ZLI 1565 with a ferroelectric liquid crystal "ZLI 3489" produced by Merck Co., assembling the two glass substrates in such a manner that the pick-up direction of the glass plates during LB film formation were parallel and opposite to each other, and the plastic beads of the sealant resin had a particle size of 2 μm.

The liquid crystal cell was once heated to 100° C., followed by gradual cooling to conduct initial orientation. The resulting cell exhibited uniform and defect-free orientation and satisfactory bistability.

While the invention has been described in detail and with reference to specific embodiments thereof, it will be apparent to one skilled in the art that various changes and modification can be made therein without departing from the spirit and scope thereof.

What is claimed is:

1. A liquid crystal device comprising an orientation film which is formed by building up at least one mixed monomolecular film on a substrate having thereon an electrode layer, said mixed monomolecular film being obtained by spreading a mixture of (a) an amphiphilic high-molecular weight substance having a number average molecular weight of from 2,000 to 300,000 and containing a repeating unit represented by formula (I):

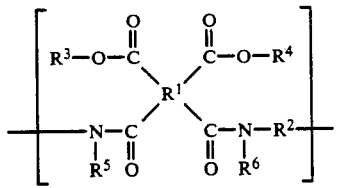

wherein at least one of $R^1$ and $R^2$ represents a group characterized by benzenoid unsaturation having at least 6 carbon atoms; and $R^3$, $R^4$, $R^5$, and $R^6$, which may be the same or different, each represents a hydrogen atom, a substituted or unsubstituted monovalent aliphatic groups having from 1 to 30 carbon atoms, a substituted or unsubstituted monovalent group composed of an alicyclic group and an aliphatic group having up to 30 carbon atoms in total, or a substituted or unsubstituted monovalent group composed of an aromatic group and an aliphatic group having up to 30 carbon atoms in total, the substituent being selected from a halogen atom, a nitro group, an amino group, a cyano group, a methoxy group, and an acetoxy group; at least one of $R^3$, $R^4$, $R^5$, and $R^6$ is a group other than those having from 1 to 11 carbon atoms or a hydrogen atom, (b) an amphiphilic high-molecular weight substance having a number average molecular weight of from 2,000 to 300,000 and containing a repeating unit represented by formula (II):

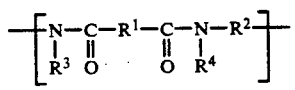

wherein $R^1$, $R^2$, $R^3$, and $R^4$ are as defined above, at least one of $R^3$ and $R^4$ being a group other than those having from 1 to 11 carbon atoms or a hydrogen atom, and (c) at least one low-molecular weight substance, the (a)/(b)/(c) mixing ratio being arbitrary, on a water surface, and subjecting the film to a heat treatment to cause cyclization.

2. A liquid crystal device as claimed in claim 1, wherein said low-molecular weight substance is selected from the group consisting of an alcohol having from 10 to 30 carbon atoms and a carboxylic acid having from 10 to 30 carbon atoms.

3. A liquid crystal device as claimed in claim 1, wherein a mixing ratio by weight of the high-molecular weight compounds (a)/(b) om 9/1 to 1/10.

4. A liquid crystal device as claimed in claim 1, wherein the low molecular weight compound (c) is used in an amount of 1/20 to ½ times by weight with respect to a total amount of the high-molecular weight compounds (a) and (b).

5. A liquid crystal device comprising an orientation film, said orientation film is a built-up film of at least one mixed monomolecular film on a substrate having thereon an electrode layer, comprising (a) a cyclized substance of an amphiphilic high-molecular weight substance having a number average molecular weight of from 2,000 to 300,000 and containing a repeating unit represented by formula (I)

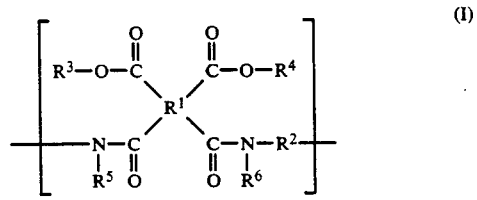

wherein at least one of $R^1$ and $R^2$ represents a group characterized by benzenoid unsaturation having at least 6 carbon atoms; and $R^3$, $R^4$, $R^5$, and $R^6$, which may be the same or different, each represents a hydrogen atom, a substituted or unsubstituted monovalent aliphatic group having from 1 to 30 carbon atoms, a substituted or unsubstituted monovalent group composed of an alicyclic group and an aliphatic group having up to 30 carbon atoms in total, or a substituted or unsubstituted monovalent group composed of an aromatic group and an aliphatic group having up to 30 carbon atoms in total, the substituent being selected from a halogen atom, a nitro group, an amino group, a cyano group, a methoxy group, and an acetoxy group, at least one of $R^3$, $R^4$, $R^5$, and $R^6$ is a group other than those having from 1 to 11 carbon atoms or a hydrogen atom, and (b) an amphiphilic high-molecular weight substance having a number average molecular weight of from 2,000 to 300,000 and containing a repeating unit represented by formula (II):

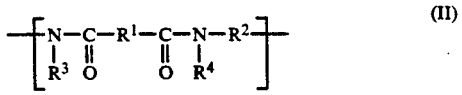

wherein $R^1$, $R^2$, $R^3$, and $R^4$ are defined above, and at least one of $R^3$, and $R^4$ being a group other than those having from 1 to 11 carbon atoms or a hydrogen atom.

* * * * *